United States Patent [19]

Strien et al.

[11] 4,220,308
[45] Sep. 2, 1980

[54] CONSOLE FOR A VEHICLE SEAT

[75] Inventors: Werner Strien, Stuttgart; Walther Göldner, Ebersbach, both of Fed. Rep. of Germany; George J. Venieris, Marina Del Ray, Calif.

[73] Assignee: Recaro GmbH & Co., Kirkcheim, Fed. Rep. of Germany

[21] Appl. No.: 53,348

[22] Filed: Jun. 29, 1979

[30] Foreign Application Priority Data

Jun. 29, 1978 [DE] Fed. Rep. of Germany ....... 2828477

[51] Int. Cl.² ........................................... F16M 13/00
[52] U.S. Cl. .................................. 248/424; 248/670; 296/64
[58] Field of Search ............... 248/424, 429, 430, 670, 248/678, 671, 676; 296/63, 64

[56] References Cited

U.S. PATENT DOCUMENTS

| | | | |
|---|---|---|---|
| 1,970,705 | 8/1934 | Montigney | 248/678 X |
| 3,286,971 | 11/1966 | Walter et al. | 248/429 |
| 3,428,976 | 2/1969 | Robinson | 296/63 X |
| 3,476,435 | 11/1969 | Hitzelberger | 248/429 X |
| 3,507,472 | 4/1970 | Agee et al. | 248/429 |
| 3,617,087 | 11/1971 | Hiramatsu | 296/63 X |
| 3,843,281 | 10/1974 | Meylan | 248/678 X |
| 3,917,342 | 11/1975 | Furuta | 248/429 X |
| 3,924,892 | 12/1975 | Geier | 296/63 X |
| 3,986,459 | 10/1976 | Riley | 248/429 X |

*Primary Examiner*—J. Franklin Foss
*Attorney, Agent, or Firm*—Wigman & Cohen

[57] ABSTRACT

The invention relates to a console for connecting a vehicle seat with attachment points provided on a floor of a vehicle. The invention is characterized by two substantially identical cross supports which are screwed together at their two side surfaces with respective side supports at selectable locations. Each side support has a mounting point for the vehicle seat. The two substantially identical cross supports are provided, at least in the area of two longitudinal end sections, with two spaced-apart adjacent rows of holes extending in the longitudinal direction of the two substantially identical cross supports. The holes can be selected by pairs for the protrusion of connecting elements so that two connecting straps for each of the two substantially identical cross supports, which straps can be attached at the attachment points on the floor of the vehicle, can be connected to their respective substantially identical cross supports in variable positions.

10 Claims, 4 Drawing Figures

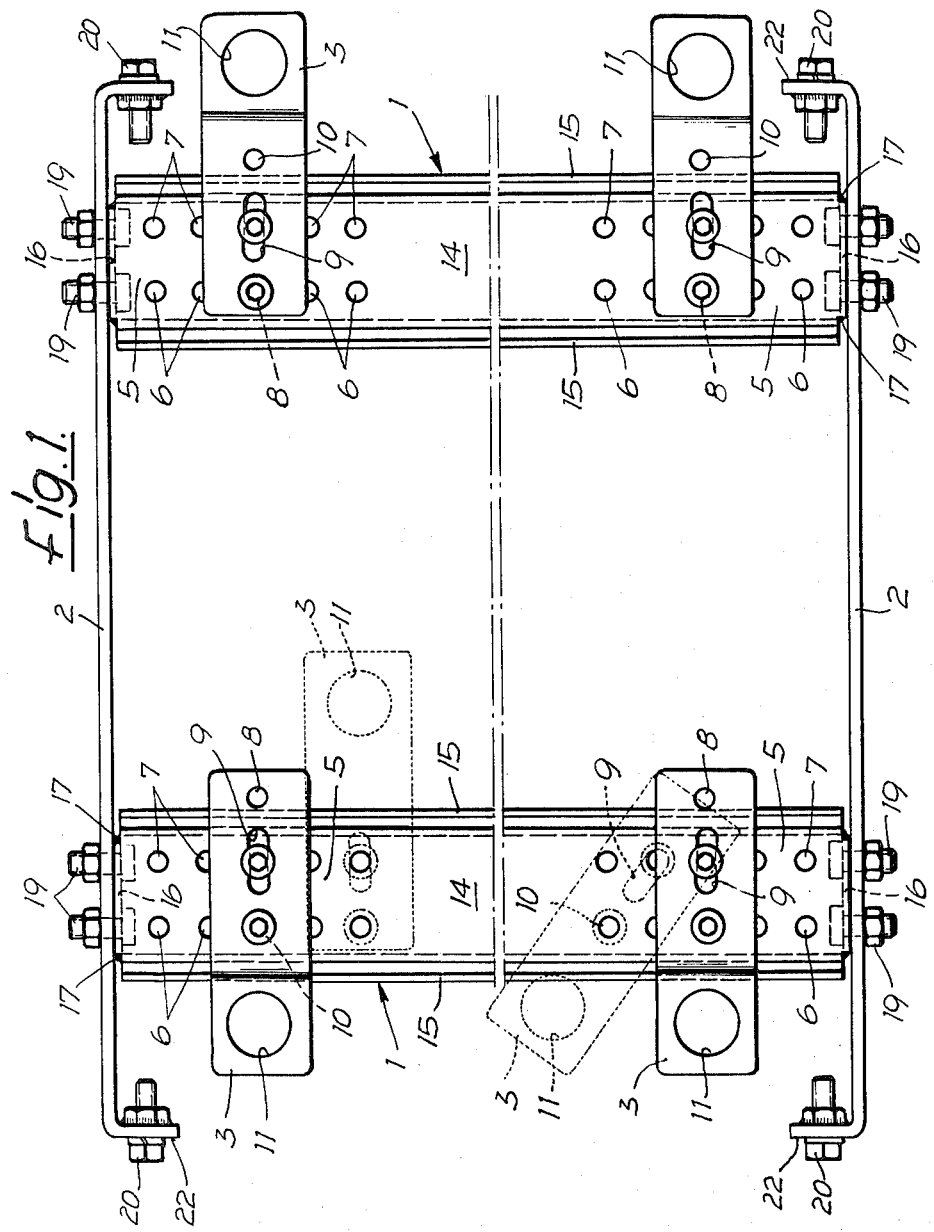

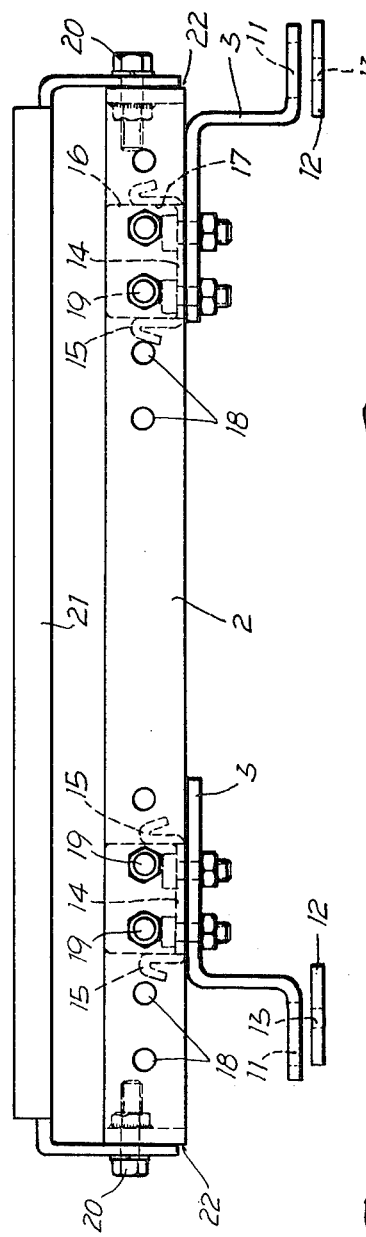
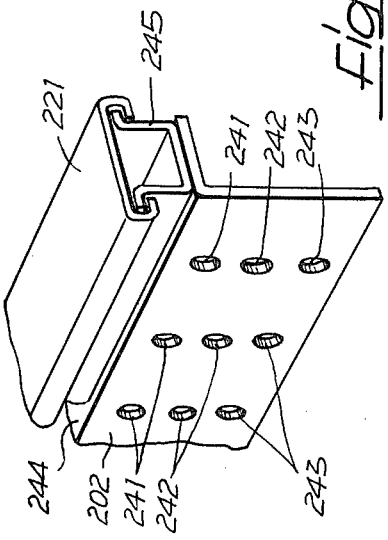
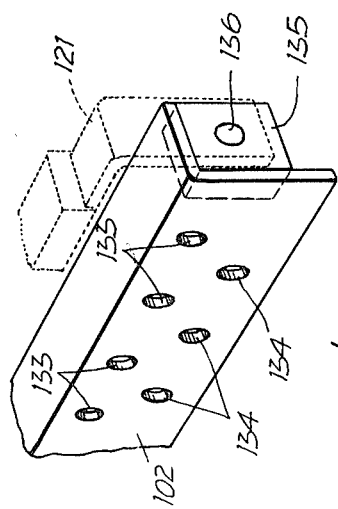

CONSOLE FOR A VEHICLE SEAT

BACKGROUND OF THE INVENTION

1. Field of the Invention

The invention relates to a console for connecting a vehicle seat with the mounting points provided in the floor of the vehicle.

2. Description of the Prior Art

Because of the various types of motor vehicles or air vehicles, the mounting points provided on the floor of the vehicle for the vehicle seats are arranged at different positions. Difficulties arise if a certain vehicle seat is to be used in different types of vehicles. In order to take into account the different positional arrangements of the mounting points in various types of vehicles, consoles have been used which provide for a lowering of the vehicle seat or a raising of the floor of the vehicle, thus acting as a so-called adapter device, in order to adapt to different conditions the positional arrangement of the mounting points of the floor of the vehicle and the vehicle seat with respect to each other.

The use of consoles makes it possible for a seat of a certain type to be used in different types of vehicles. However, the disadvantage thereby is that to adapt a certain vehicle seat to different vehicles, different consoles must be prepared of which each console, on the basis of its special form, is adapted to the circumstances of the type of vehicle concerned.

SUMMARY OF THE INVENTION

The basic objective of the invention is to create a console which can adapt vehicle seats of a certain construction to different types of vehicles with different mounting points provided on the vehicle floor.

According to the invention, this objective is achieved by a console characterized in that two substantially identical cross supports, the two side surfaces, which are screwed at selectable points to longitudinal side supports having respective attachment locations for the seat, are provided at least in the area of the two end sections with two spaced, adjacent rows of holes extending in the longitudinal direction of the cross support, the holes of which are selectable in pairs for the protrusion of the connecting screws, by means of which two connecting straps attached to the mounting points of the floor of the vehicle can be connected with each cross support in a selectable position. By means of the fact that, according to the invention, both the connecting straps, which are screwed on one end to the mounting points of the floor of the vehicle and on the other end are connected with the cross supports of the console, can be arranged in selectable positions on the cross supports, and the longitudinal side supports, by means of which the vehicle seat is connected with the cross supports, can be attached in a selectable positional relationship relative to the cross supports thereto, there results the possibility of adapting a vehicle seat of a certain construction to the widest variety of circumstances of different types of vehicles. The universal utility of the console manufactured according to the invention makes it superfluous to prepare different consoles adapted to specific associated types of vehicles.

BRIEF DESCRIPTION OF THE DRAWINGS

The invention is described below in greater detail with the aid of the drawings.

Shown are:

FIG. 1—a bottom view of an exemplary embodiment of the console according to the invention;

FIG. 2—a front view of the exemplary embodiment, according to FIG. 1, with a screwed-on rail for the adjustable attachment of the vehicle seat;

FIG. 3—a breakaway perspective view of a longitudinal side support for a different exemplary embodiment of the console; and FIG. 4—a perspective view, similar to FIG. 3, of a longitudinal side support for a further exemplary embodiment of the console.

DETAILED DESCRIPTION OF THE PREFERRED EMBODIMENTS

FIG. 1 shows a first exemplary embodiment of the console having two cross supports 1 which are substantially identical and, together with two longitudinal side supports 2 which run perpendicular to the cross supports 1, form the main portion of the console. The cross supports 1 can be connected with the floor of the vehicle by means of a plurality of almost identical connecting straps 3. In the exemplary embodiment illustrated in FIGS. 1 and 2, four connecting straps 3 are provided, one of which is associated with each end section 5 shown in FIG. 1 of the cross supports 1. For the attachment of the connecting straps 3 to the cross supports 1, two spaced adjacent rows of attachment holes are provided in the end sections 5 thereof, of which the holes of the respective left row are designated with the reference numeral 6 and the holes of the respective right row are designated with the reference numeral 7. The rows of holes 6 and 7 extend in the longitudinal direction of the cross supports 1.

In the section which can be connected with the associated cross supports 1, the connecting straps 3 each have a row of holes, the bores 8, 9, and 10 of which are displaced relative to each other in the longitudinal direction of the connecting straps 3. The bore 9, arranged between the bores 8 and 10, is formed as a differently shaped, longitudinally oriented hole. The end of the connecting strap 3, which can be screwed to the floor of the vehicle, has a mounting hole 11, the diameter of which is substantially larger than the shaft diameter of the screw penetrating the hole 11, which hole 11 produces the screw connection with the floor of the vehicle.

The arrangement of the parallel rows of holes 6 and 7 in the end sections 5 of the cross supports 1 makes it possible that, in connection with the rows of bores 8, 9, and 10 of the connecting straps 3, the cross supports 1 can be screwed to the floor of the vehicle at practically any desired arrangement of connecting points by means of the connecting straps 3. The rows of holes 6 and 7 running in the longitudinal direction of the cross supports 1 makes possible a position adjustment in the direction of the cross supports 1. In the perpendicular direction thereto the position adjustment is possible on the basis of the rows of bores 8, 9, and 10 of the connecting straps 3. Because the bore 9 of the connecting straps 3 is formed as a longitudinally oriented hole, a pair of attachment holes 8 is also available for the screw connection of cross supports 1 with the connecting straps 3, if the elements 1 and 3 are not mutually perpendicularly directed relative to each other, but when the connecting straps 3 are only somewhat pivoted from the plane of the cross supports 1. This angular arrangement of the connecting straps 3 is illustrated in the left portion of FIG. 1 with the broken line. In the upper left-hand corner in FIG. 1, it is also shown that the connecting straps 3 can either be arranged in such a manner that their attachment hole 11 is directed outwardy (shown in solid lines) or that the attachment hole 11 can be displaced inwardly relative to the cross support 1 (shown in broken lines). On the basis of this diversity of adjustment possibilities of the connecting straps 3 relative to the cross support 1, a wide range of mounting points on the floor of the vehicle can be achieved. In addition, because the attachment hole 11 of the connecting straps 3 is formed substantially larger than the diameter of the connecting screw to be attached in the floor of the vehicle, there is a certain amount of play so that the console can be universally used for all kinds of vehicles with differently arranged mounting points.

The relationship between the shaft diameter of the screw which can be connected with the floor of the vehicle and the size of the attachment hole 11 may be clearly seen in FIG. 2 where a disk 12 is shown. This disk 12 is used in the forming of the screw connection with the floor of the vehicle and has a bore 13 therethrough. The diameter of bore 13 is adapted basically to the shaft diameter of the screw.

The cross supports 1 are embodied in the shape of a U. In the yoke portion 4 shown in FIGS. 1 and 2 are formed the holes 6 and 7 shown only in FIG. 1. Both shanks 15 of the U are bent outwardly, as may clearly be seen in FIG. 2, in order to achieve an increased rigidity of the cross supports 1. The shanks 15 could also be bent inwardly for this same purpose. Both side surfaces 16, to which the cross supports 1 can be connected with the longitudinal side supports 2, are formed in one piece with the yoke element 14 and are welded at surface 17 with the straight portion of the shanks 15.

A further adjustment possibility of the console is achieved in that the longitudinal side supports 2 for the connection with the cross supports 1 have rows of bores 18. By means of screws 19, the longitudinal side supports 2 can therefore be attached in different selectable relative positions on the cross supports 1, thus resulting in longitudinal adjustment of the vehicle seat. In the exemplary embodiment shown in FIGS. 1 and 2, screws 20 serve for the adjustment of the vehicle seat, at which only in FIG. 2 is shown a seat holding rail 21. A selectable height adjustment of the vehicle seat results when, as is not shown in the drawing, a plurality of successively arranged bores for the screws 20 is provided in both side surfaces 22 of the longitudinal side supports 2.

Other types of height adjustment of the vehicle seat are provided in the two different exemplary embodiments according to FIGS. 3 and 4. In the example in FIG. 3, the longitudinal rail 102 has not only a row of holes corresponding to the bores 18 in FIG. 2, but two rows of bores 133 and 134, arranged one above the other, the row of bores 134 arranged vertically displaced with respect to the row of bores 133, are provided. A further possibility of variation for the position adjustment of the vehicle seat results from the fact that the bores 133 of the one row of holes are arranged in a displaced manner relative to the bores 134 of the other row of bores in the longitudinal direction of the longitudinal side support 102. In the exemplary embodiment of FIG. 3, the longitudinal side support 102 is formed as an angularly profiled bar, one shank of which is provided with the bores 133 and 134 for the connection to the side surface 16 of the associated cross support 1. At the two ends of the angularly profiled bars, an end element 135 is welded and is provided with one or more bores. In the example of FIG. 3, only a single bore 136 is provided in order to make possible the screw connection of the seat holding rail 121.

In the exemplary embodiment shown in FIG. 4, the holding rail 202 is formed as an angularly profiled bar is provided with three stacked rows of holes or bores 241, 242, and 243 in the shank provided for the connection to the cross support 1. A guide rail 245 is attached to the other shank 244 of the angularly profiled bar for the mounting of the vehicle seat, in which guide rail 245 a slide rail 221 is guided in a longitudinally shiftable manner.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A console for connecting a vehicle seat with attachment points provided on a floor of a vehicle, comprising:
    two substantially identical cross supports being connected together at their two side surfaces with respective side supports at selectable locations;
    each of said side supports having means for mounting the vehicle seat;
    each of said two substantially identical cross supports being provided at least in the area of two longitudinal end sections thereof with two spaced-apart adjacent rows of aperture means extending in the longitudinal direction of the two substantially identical cross supports;
    said aperture means being selected by pairs for the protrusion of means for connecting at least two straps to each of the two substantially identical cross supports; and
    said straps being attached at the attachment points on the floor of the vehicle and being connected to their respective substantially identical cross supports in variable positions.

2. Console according to claim 1, characterized in that:
    each of the two straps have rows of corresponding aperture means extending in the longitudinal direction of said straps in one end section which connects with one of the two spaced-apart adjacent rows of aperture means of the two substantially identical cross supports; and
    each of said rows of corresponding aperture means includes a differently shaped aperture means between two adjacent aperture means which extend in the longitudinal direction of the same row.

3. Console according to claim 1, characterized in that each of the two straps is provided with an aperture means, each being positioned in another end section of the respective strap and having a diameter substantially larger than the shaft diameter of a means for penetrating the aperture means.

4. Console according to claim 1, characterized in that:
    said two substantially identical cross supports have a cross-sectional shape in the form of a U with the two shanks of the U being bent; and
    said two side surfaces of the two substantially identical cross supports are formed in one piece with the yoke element of the U and are rigidly connected to the two shanks of the U.

5. Console according to claim 1, characterized in that the side supports have a first row of aperture means extending in the longitudinal direction of each side support in areas which can be selected for connection with the respective substantially identical cross supports.

6. Console according to claim 5, characterized in that at least one additional row of aperture means is provided in the side supports at a distance extending in the longitudinal direction adjacent the first row of aperture means.

7. Console according to claim 1, characterized in that the two side supports have at least two aperture means, arranged in the two side surfaces, for allowing a height adjustment of the vehicle seat.

8. Console according to claim 1, characterized in that the side supports are bars having an angular cross section, on one shank of which the side surface of the respective substantially identical cross support abuts and, on whose other shank, a rail surface means for serving longitudinal adjustment of the vehicle seat can be arranged.

9. Console according to claim 8, characterized in that an end element is rigidly connected onto each end of each bar and is provided with at least one aperture means arranged in the longitudinal direction of the respective bar.

10. Console according to claim 1, characterized in that:
the two substantially identical cross supports are connected together by screwing.

* * * * *